Figure 1:
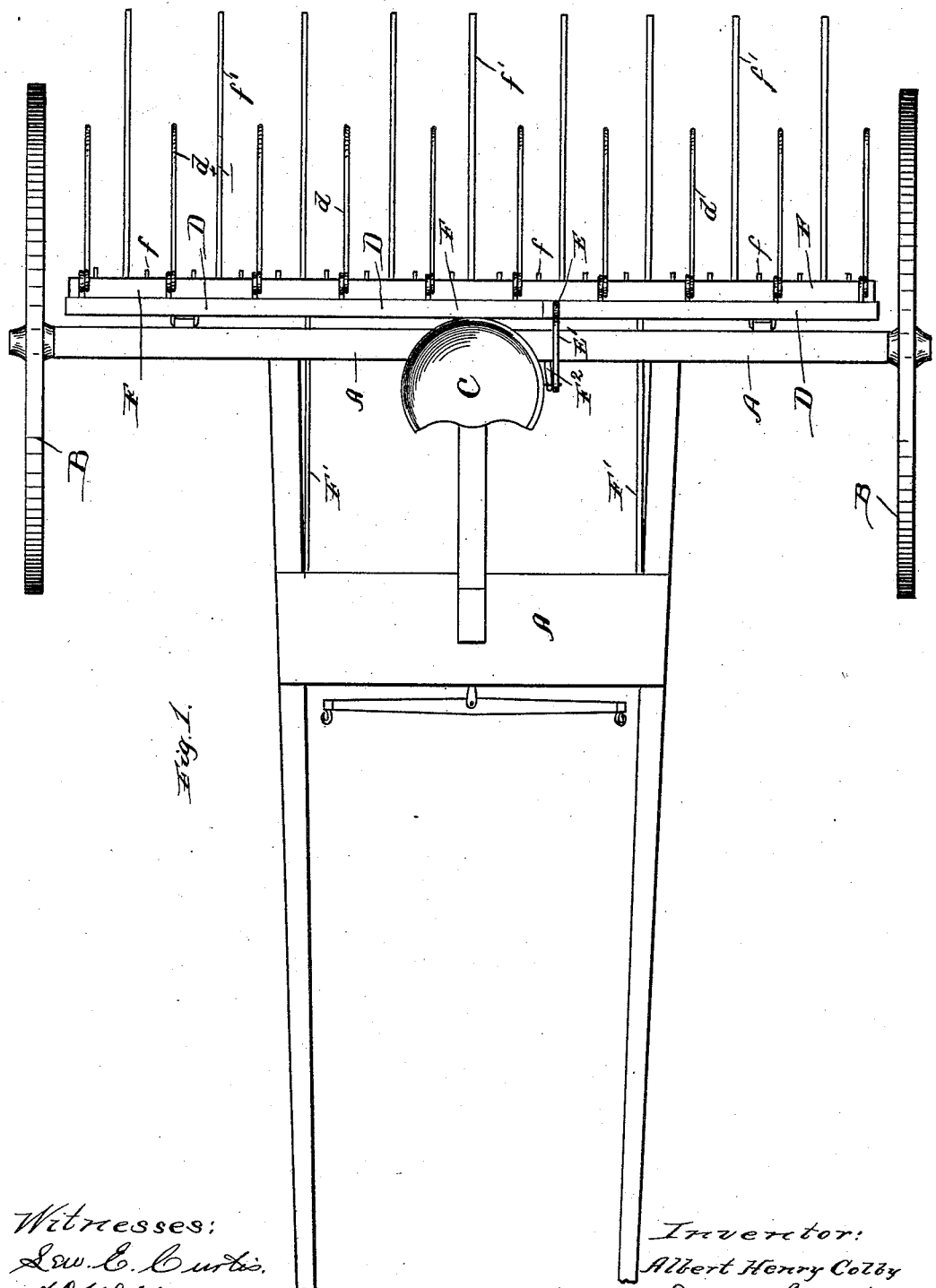

(No Model.) 2 Sheets—Sheet 1.

A. H. COLBY.
HORSE HAY RAKE.

No. 432,509. Patented July 22, 1890.

Witnesses:
Inventor:
Albert Henry Colby
By Munday, Evarts & Adcock
his Attorneys.

(No Model.) 2 Sheets—Sheet 2.
A. H. COLBY.
HORSE HAY RAKE.
No. 432,509. Patented July 22, 1890.
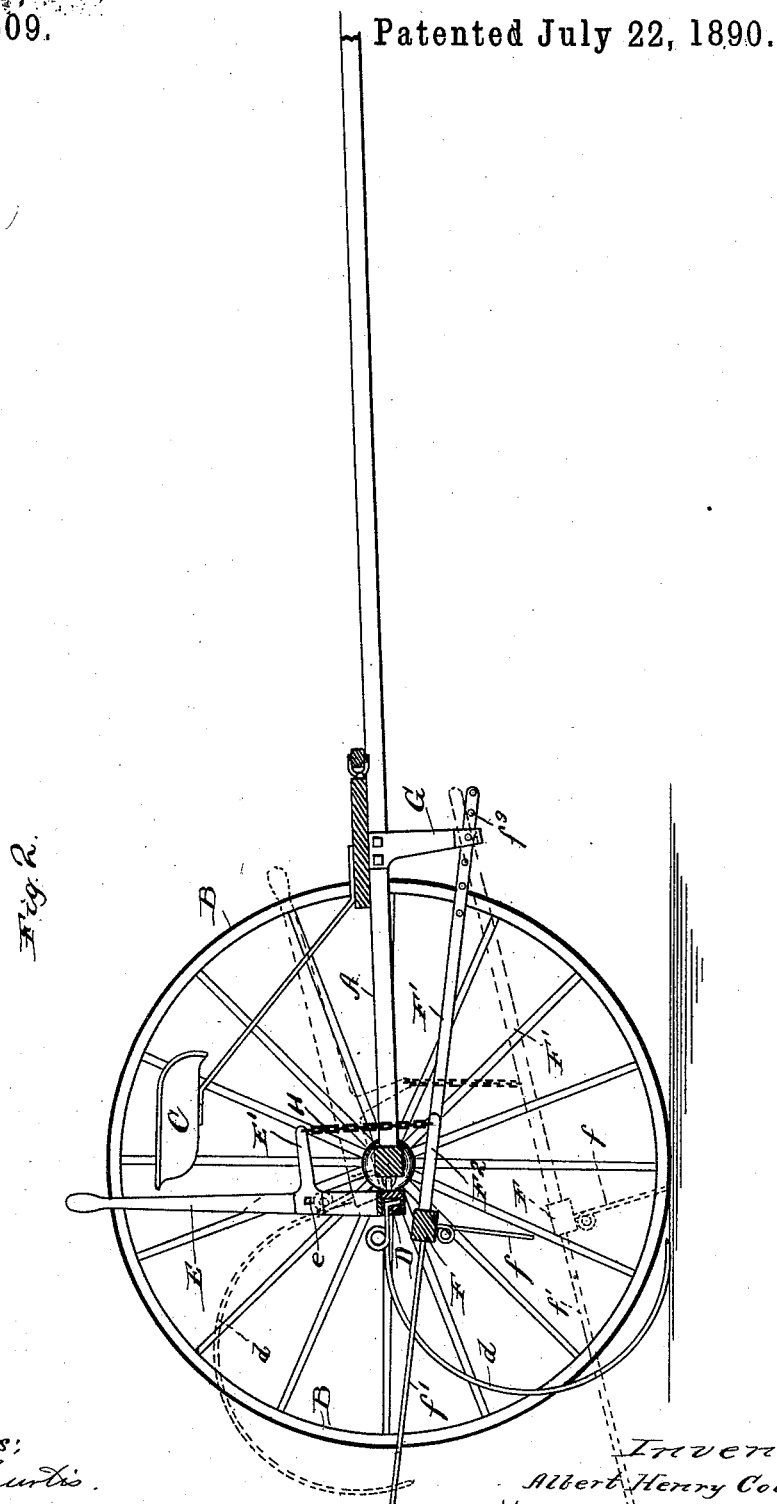

UNITED STATES PATENT OFFICE.

ALBERT HENRY COLBY, OF McHENRY, ILLINOIS, ASSIGNOR TO HIMSELF AND OLIVER W. OWEN, OF SAME PLACE.

HORSE HAY-RAKE.

SPECIFICATION forming part of Letters Patent No. 432,509, dated July 22, 1890.

Application filed February 8, 1890. Serial No. 339,731. (No model.)

*To all whom it may concern:*

Be it known that I, ALBERT HENRY COLBY, a citizen of the United States, residing in McHenry, in the county of McHenry and State of Illinois, have invented a new and useful Improvement in Horse Hay-Rakes, of which the following is a specification.

My invention relates to improvements in hay-rakes of that class which are propelled by horse or other power as contradistinguished from hand-rakes. These rakes as heretofore constructed produce a very wide windrow, or windrow with a tail or extension of unraked hay in front of the windrow, as the rake-teeth are necessarily raised from the ground at intervals to dump or unload the gathered hay. Ordinarily the distance traveled by the rake while the teeth are raised in the dumping operation is from six to ten feet, and this of course represents the actual width of the windrow or of the windrow and its tail or extension of unraked hay. The subsequent labor of handling the hay is largely increased by the great width and extent of the windrow, and, further, by the fact that the space covered by the windrow being unraked the hay in this space is left embedded in the stubble as it falls when cut by the mower, and is for this reason much more difficult to gather up by hand or with a fork than it would be if this space had been once raked and the hay freed from the stubble by the rake-teeth.

It is the object of my invention to provide a horse-rake which will obviate the difficulty before mentioned and at the same time be of a simple, durable, and efficient and inexpensive construction.

A further object is to so adapt my invention as that it may be quickly and cheaply applied to any suitable form or kind of horse hay-rake now commonly in use.

To this end my invention consists in the combination of a horse hay-rake of any well-known or ordinary construction having a wheeled frame and a dumping or raising and lowering rake, with a secondary or supplemental rake mounted upon the same wheeled frame, which operates alternately with the main rake, and is raised and lowered by the same mechanism as that which operates the main rake, said supplemental rake being provided with clearing rods or teeth for clearing the hay from the main rake.

It also consists in the novel devices and novel combinations of parts and devices herein shown and described, and more particularly pointed out in the claims.

In the accompanying drawings, which form a part of this specification, and in which similar letters of reference indicate like parts, Figure 1 is a plan or top view of a rake embodying my invention, and Fig. 2 is a central section of the same.

In said drawings, A represents the frame of the machine, B its wheels, and C the driver's seat.

D is the rake-head, and $d$ the teeth of the usual or main rake, and E its operating lever or handle by which the rake is raised to dump or unload it.

All these parts are or may be of any ordinary construction now well known to those skilled in the art, and therefore require no detailed description, especially as their particular form and construction are immaterial and not a part of my present invention.

F is the rake-head, and $f$ the teeth of the supplemental or secondary rake. The rake-head F is also provided with clearing rods or teeth $f'$, which operate to clear the hay from the teeth of the main rake when the latter is raised to unload or dump the gathered hay. The rake-head is furnished with forwardly-extending rigid arms F' F', preferably two in number, which are pivotally connected at their forward ends to the brackets G, secured to the frame A. The operating-lever E of the main rake is provided with an arm E', to which arm an arm $F^2$, projecting from near the middle of the supplemental rake-head F, is connected by means of a chain or link or other suitable connection H, so that when the main rake is lowered into position for operation, as shown by the heavy lines in Fig. 2, the supplemental rake will be raised out of the way. In like manner, when the main rake is raised to unload the gathered hay, the supplemental rake will be automatically and by the same movement and mechanism lowered into position for operation. By this means it will be seen that the two rakes operate alternately, and that the supplemental rake will gather the hay and rake the space which otherwise would be unraked.

The bracket G is removably attached to the frame A or to the shafts, or to any other suitable part of the frame by bolts, and the arm E' is preferably attached in a similar way by bolts $e$ to the lever E, so that the supplemental rake may be readily attached to any ordinary rake, whether old or new, and after it leaves the shop as well as before. It should also be observed that the supplemental rake may be connected with any other suitable movable part of the main rake or its operating mechanism as well as the lever E, so long as the supplemental rake is made to operate alternately with the main rake. I however prefer to connect the supplemental rake with the operating handle or lever of the main rake, as I deem this the better and more convenient construction.

The supplemental rake-supporting arms F' F' are provided with a series of holes $f^3$ for purpose of adjusting the supplemental rake attachment, so that it will properly combine with different kinds or makes of rakes.

I claim—

1. The combination, with a wheeled rake-frame, of a main rake and a secondary or supplemental rake operating alternately with the former, said supplemental rake having clearing rods or teeth to clear the hay from the main rake, substantially as specified.

2. The combination, with a wheeled rake-frame, of a main rake and a secondary or supplemental rake operating alternately with the former, and a common operating-lever with which both rakes are connected and by which they are alternately raised and lowered, said supplemental rake having clearing rods or teeth to clear the hay from the main rake, substantially as specified.

ALBERT HENRY COLBY.

Witnesses:
 JAMES B. PERRY,
 O. N. OWEN.